United States Patent [19]

Pietzsch et al.

[11] 4,393,698
[45] Jul. 19, 1983

[54] DEVICE FOR MEASURING HOLLOW CYLINDER SURFACES

[75] Inventors: Ludwig Pietzsch, Im Rosengärtle 14, D-7500 Karlsruhe 41, Fed. Rep. of Germany; Knud Overlach, Ettlingen; Manfred Wamser, Karlsruhe, both of Fed. Rep. of Germany

[73] Assignee: Ludwig Pietzsch, Karlsruhe, Fed. Rep. of Germany

[21] Appl. No.: 276,159

[22] Filed: Jun. 22, 1981

[30] Foreign Application Priority Data

Jun. 27, 1980 [DE] Fed. Rep. of Germany ....... 3024331
Oct. 3, 1980 [DE] Fed. Rep. of Germany ....... 3037519

[51] Int. Cl.³ .......................................... G01M 15/00
[52] U.S. Cl. ........................................ 73/118; 73/104
[58] Field of Search ......................... 73/118, 104, 105; 33/174 P, 174 Q

[56] References Cited

U.S. PATENT DOCUMENTS

4,167,066 9/1979 Cooper et al. .................... 33/174 P

Primary Examiner—Jerry W. Myracle
Attorney, Agent, or Firm—Laubscher, Philpitt & Laubscher

[57] ABSTRACT

A measuring device for hollow cylindrical surfaces, such as bores and the like, comprises a housing to be fixed in the bore by clamps, a measuring arm rotatable by a first step motor, a measuring head axially movable along the measuring arm substantially parallel to the axis of the bore surface by a second step motor and a sensor incorporated in the measuring head and radially movable relative to the measuring head against the force of a leaf spring in contact with the bore surface. The leaf spring supports strain gauges, the output signals of which are representative of the radial or transverse paths of the sensor and thereby for the shape of the bore surface to be measured.

14 Claims, 11 Drawing Figures

DEVICE FOR MEASURING HOLLOW CYLINDER SURFACES

BACKGROUND OF THE INVENTION

The instant invention relates to a method of and a measuring device for measuring hollow cylinder surfaces, such as bores, inner tube walls, and the like, particularly cylinder bores of internal combustion engines, by means of a measuring head adapted for controlled guidance across the surface to be measured and including a sensor which is movable transversely of the surfaces and adapted to be pressed against the same and the paths of which are an indication of the shape of the surface to be measured.

SUMMARY OF THE INVENTION

The invention is to provide a method and measuring device of the kind mentioned which permit simple and highly accurate measuring by employing the scanning principle with contact such that an exact statement is obtained of the deviation in shape of the surface to be measured from a comparative cylinder surface or an ideal circular cylindrical surface. To solve this problem, it is provided, in accordance with the invention, with a method of the kind mentioned that the sensor is adjusted to a predetermined radius corresponding substantially to the nominal diameter of the surface to be measured, that the measuring head is caused to describe an ideal circular cylindrical surface with the sensor unloaded, that the sensor is controlled to move against any desired point or a plurality of desired points on the surface to be measured, and that the sensor, when in measuring position, detects the deviations from the ideal surface.

The ideal circular cylindrical surface may be described either by scanning circular cylinder cuts in different planes or by scanning generator lines on different angles and memorized pointwise in the form of comparative values which then serve for comparison with the measured values and thus for the formation of the deviation.

A measuring device of the kind mentioned initially is characterized, in accordance with the invention, in that the measuring head is provided at a measuring arm disposed substantially parallel to the axis of the hollow cylinder surface, in that the measuring arm is rotatable by means of a first step drive means, in that the measuring head is axially movable along the measuring arm by a second step drive means, in that the sensor is guided at the measuring head for radial displacement with respect to the measuring arm, against the force of a measuring spring, and in that a fixing device is provided by means of which the measuring arm can be fixed in an axial position approximately parallel to or aligned with the axis of the surface to be measured.

An advantageous further development of the invention is characterized in that the measuring spring is a leaf spring equipped with foil strain gauges and connected at its free end with the sensor and clamped at its clamping end at a measuring head housing such that, upon movement of the sensor, the free spring end moves practically exclusively in the direction of the longitudinal axis of the sensor so that the foil strain gauges emit an electrical signal corresponding, particularly being proportional to the path of the sensor.

With this further development of the invention the leaf spring, acting as a measuring spring, exactly follows the movement of the sensor e.g. a sensor pin. This excludes falsifications of the measurement result as the leaf spring does not carry out any transverse movements relative to nor causes forces of reaction on the sensor pin. Thus electrical output signals of the foil strain gauges are obtained which correspond very accurately to the radial distance travelled by the sensor pin, e.g. being proportional to the same. In this way the output signals afford highly accurate measurement values which represent the shape of the surface measured and are suitable for further processing in an output device or computer.

In an advantageous embodiment of the invention the free end of the leaf spring is disposed transversely of the longitudinal axis of the sensor pin, and the clamping end of the leaf spring and the free end of the leaf spring holding the sensor pin include an angle of between 145° and 165°, preferably 160°. The leaf spring may be curved or rectilinear between its free end held at the sensor pin and its clamping end held at the measuring head. The preferably constantly curved configuration, i.e. the circular arc shape can be calculated in simple manner such that the leaf spring will carry out the movement mentioned, and the angle mentioned will result at a certain length of the leaf spring. A rectilinear leaf spring can be manufactured more easily.

When the measuring head moves axially or in rotation to scan discrete points of the surface to be measured, current supply to the measuring head or the foil strain gauges arranged on the leaf springs must be guaranteed. This can be a problem in that the current supply means, for instance a cable, can introduce forces into the measuring head which may falsify the result of the measurement. To avoid this falsification, it is provided in accordance with a further embodiment of the invention that a cable feeding the measuring head with current extends from a fixed housing along the measuring arm to the measuring head where it is secured, passing a cable compensating device which stores or passes out a cable length upon rotation or axial displacement of the measuring head with respect to the housing.

In a particular realization of this concept preferably the cable compensating device comprises a compensating roller to form a cable loop which is to be wound on and off at the housing, the compensating roller being disposed on a slide which is movable in circumferential direction at the housing and biased by a spring against the direction of cable pull, and the cable compensating device further comprises a guide device including a guide roller which is rotatable with the measuring arm.

If bores of greater length, such as inner tube walls are to be measured, conveniently the fixing device comprises two axially spaced clamping jaw structural groups by means of which the measuring device can be clamped to the bore to be measured. The housing is axially displaceable by a defined extent to another measuring section in the bore to be measured by means of a shift rod, and the two clamping jaw groups are operable by links supported for adjustment at the shift rod.

In this manner the measuring device can be shifted easily from section to section within the bore. Advantageously the links comprise a first shaft rotatably supported in the hollow shift rod and carrying at its inner end a drive member for operating at least one of the two clamping jaw groups, said first shaft being adapted to be driven by a rotary drive means. The links may comprise a second shaft which extends through the first shaft, designed to be hollow, and comprises a rotary drive means of its own and operates the one clamping jaw group, while the first shaft operates the other clamping jaw group.

The shift rod may be supported for displacement in the area of the entrance of the bore by a bearing firmly supported at the entrance of the bore, the shift rod comprising an axial path measuring scale which can be read at a marking provided on the bearing. This permits fine adjustment of the path of displacement of the shift rod and thus of the entire measuring device.

The shift rod may comprise at least one marked barrel line which helps to avoid any twisting of the shift rod during axial displacements of the measuring device.

It is advantageous to couple the shift rod with the housing of the measuring device by a universal joint fixed for rotation so as to prevent the transmission of any bending stress to the housing and thus to the measuring device. This universal joint may be a rubber joint, a cardan joint, a homokinetic joint, or any other universal joint of known structure.

BRIEF DESCRIPTION OF THE FIGURES

The invention will be described further, by way of example, with reference to the accompanying drawings, in which.

DETAILED DESCRIPTION

Figure 1:
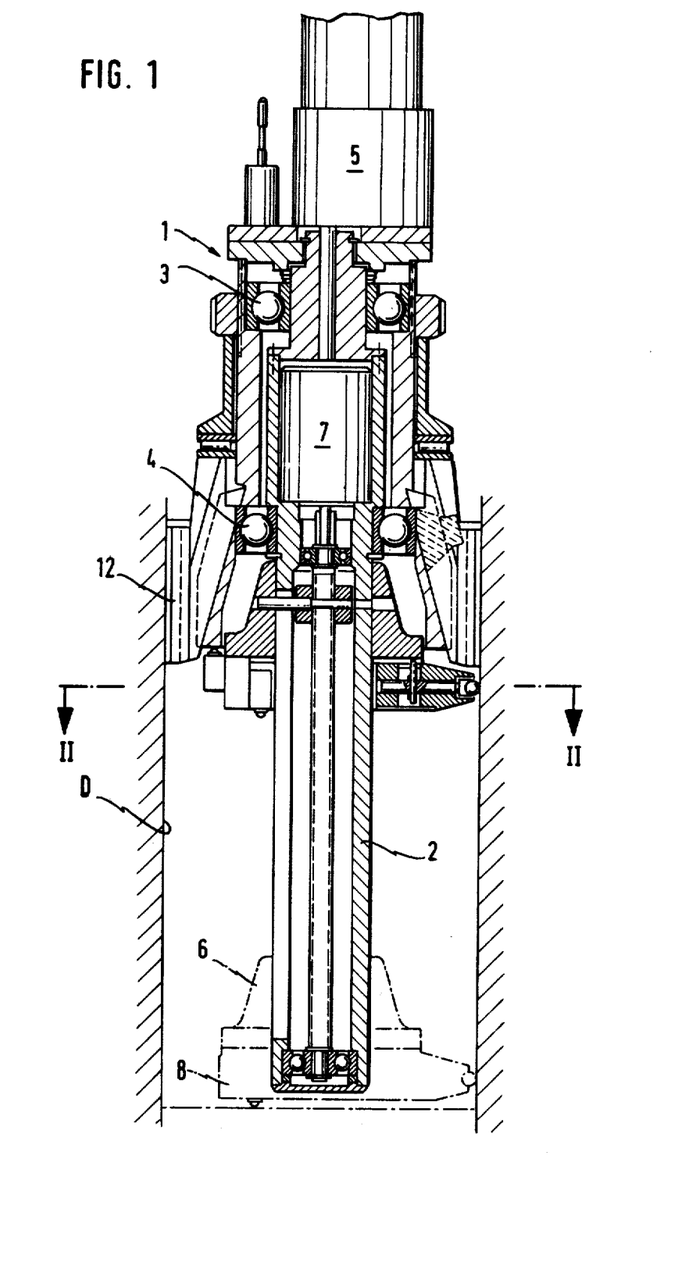
FIG. 1 is longitudinal sectional view of a measuring device including a measuring probe in accordance with the invention.
Figure 2:
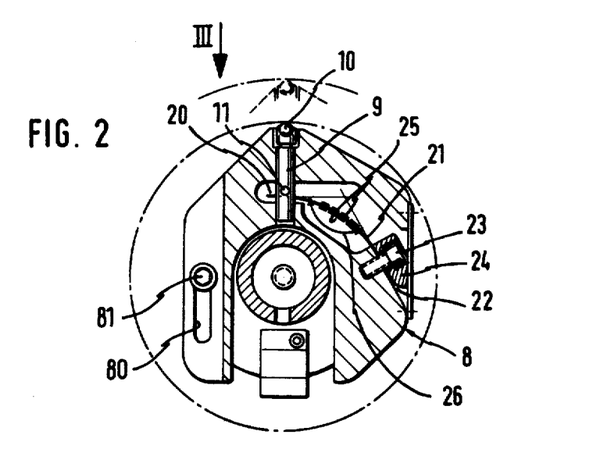
FIG. 2 is a sectional view along line II—II of FIG. 1.
Figure 3:
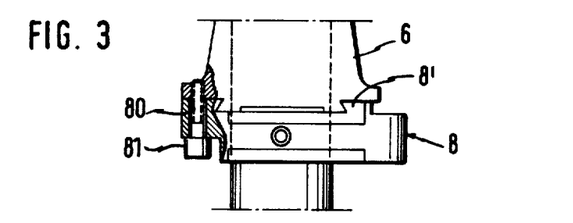
FIG. 3 is a partial view as seen in the direction of arrow III in FIG. 2.

The measuring device shown in FIG. 1 comprises a multipart housing 1 in which a measuring arm 2 is supported by means of biased precision ball bearings 3, 4. The measuring arm 2 is adapted to be set into rotary motion by a step motor 5. A measuring slide 6 is movable axially along the measuring arm 2 by means of a step motor 7 received in the housing. The measuring slide 6 carries a measuring head 8 which can be fine-adjusted radially by hand along a dovetail guide 8' to the respective nominal diameter of the bore D to be measured. A longitudinal slot 80 is provided for this purpose in the measuring head 8 as well as a set screw 81 (FIGS. 2, 3). The measuring head includes a radially movable sensor or sensor pin 9 having a ruby tip 10. For exact conversion of the shifting of the sensor pin 9 into an electrical output signal the slotted free end 20 of a leaf spring 21 is retained at the sensor pin 9 by a transverse pin 11 such that this free end extends transversely of the longitudinal axis of the sensor pin 9. Starting from the sensor pin, the leaf spring 21 is curved towards its clamping end 22 at the measuring head 8 where the leaf spring is firmly clamped by means of a screw 23 and a retainer 24. The angle included between the free end 20 and the clamping end 22 lies in the order of between 145° and 165°, preferably being 160°. At a certain spring length, this provides a curvature which has the effect that movement of the sensor pin in radial direction will cause movement of the free end 20 of the leaf spring in the same direction without any component of movement in a direction transverse to the sensor pin 9 so that no forces of reaction acting in transverse direction are transmitted from the leaf spring to the sensor pin 9. For simpler manufacture, the curvature may be constant, thus giving the leaf spring circular arc shape. If the leaf spring is rectilinear between its free end 20 and its clamping end 22, the manufacture is simpler still.

Figure 4:
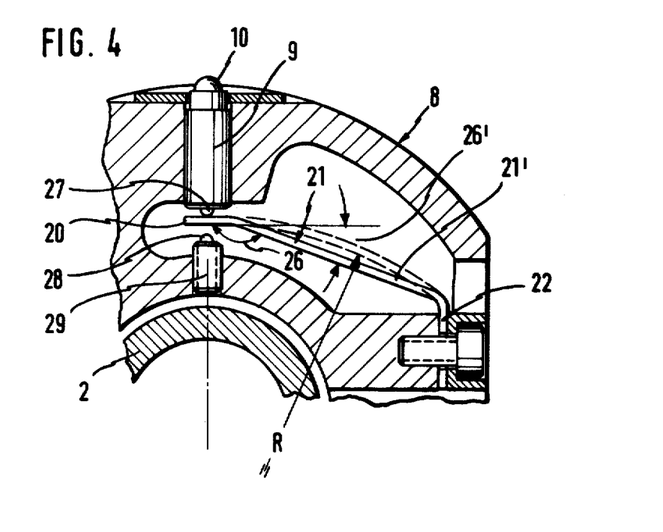
FIG. 4 is a partial sectional view similar to FIG. 2, showing a modified embodiment on enlarged scale.

In the embodiment shown in FIG. 4 in which the same reference numerals are used for items having the same functions as before, a rectilinear leaf spring 21 is shown in continuous lines. It has ends 20, 22 which are bent at an angle with respect to the rectilinear intermediate portion 21' so that the clamping end 22 extends at an angle of 90° with respect to the free end. The angle 26 between the free end 20 and the rectilinear intermediate portion 21' is approximately 160° which corresponds to an opening angle 26' of 20°. With this embodiment the free end 20 of the leaf spring 21 abuts lock under bias against a hemispherical head 27 disposed at the inner end of the sensor pin 9. The opposed support is a hemispherical head 28 formed at a threaded bolt 29.

As an alternative FIG. 4 shows in discontinuous lines a circular arc shape indicated by radius R. This configuration is easier to calculate in respect of the desired result, yet its manufacture is more complicated in comparison with the straight shape shown in continuous lines.

With both embodiments foil strain gauges 25 are glued on both sides of the central portion of the leaf spring 21. These foil strain gauges are connected in per se known manner in a bridge circuit such that they supply a highly accurate electrical output signal proportional to the path of the free end 20 in the direction of the longitudinal axis of the sensor pin 9. This is warranted by the arrangement described above of the leaf spring and by the general design of the leaf spring with its great linearity and small return force. With a realized leaf spring, for example, the linearity in the measuring range is less than $10^{-3}\%$ deviation from the straight line.

In an embodiment of the measuring device the step motor 5 which produces the rotary motion of the measuring arm 2 has a resolution or a step width of exactly 0.417°, whereas the step motor 7 which produces the axial motion of the measuring head 8 has a resolution of 13.889 $\mu$m. This high resolution permits fine positioning at maximum repetitive accuracy.

Figure 5:
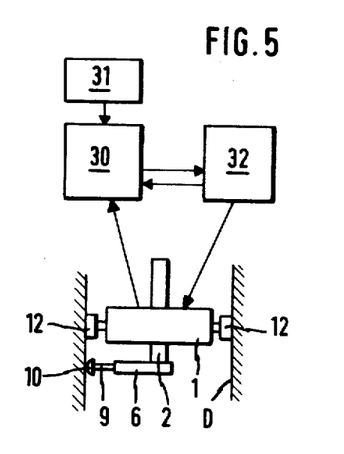
FIG. 5 is a diagrammatic view of a measuring system including a measuring device according to the invention.

In the diagrammatic representation of FIG. 5 letter D indicates the inner contour of the cylindrical bore to be measured. A measuring device including a housing 1 in which a measuring arm 2 is arranged so as to be driven in rotation is inserted in the cylindrical bore. A measuring slide 6 is arranged for axial movement along the measuring arm 2. The measuring slide 6 carries a measuring head 8 including a radially adjustable sensor pin 9 which has a measuring tip 10. The housing 1 can be clamped in the bore D by means of clamping jaws 12 which are evenly distributed around the periphery.

FIG. 5 shows the measuring device described in operating position. The measuring tip 10 of the sensor pin 9 effects pointwise scanning of the inner contour D of the bore along generator and circumferential lines of the bore. The result of the measurement is applied to a computer 30 to which a memory 31 is connected. The memory contains the values which were obtained by moving the unloaded sensor pin 9 against a plurality of points on a comparative cylinder and then memorized.

The measured values of the inner contour D obtained by the measuring device described are determined as follows by the computer 30:

Regardless of the actual position of the measuring tip 10 the computer 30 calls the values closest to this position from the memory 31, interpolates them with respect to the intermediate position assumed at the measuring tip 10, and subtracts the interpolated value from the actual measured value. Thus the actual measured value is corrected such that any truth of rotation inaccuracies of the measuring device shown or any other measurement errors are compensated.

The computer 30 then applies an adjustment signal to a control device 32 which releases axial adjustment of the measuring slide and perhaps rotation of the measuring arm 2 in circumferential direction to a new measuring point at the inner contour D. The arrows designate the directions of the signal flow.

Figure 6:
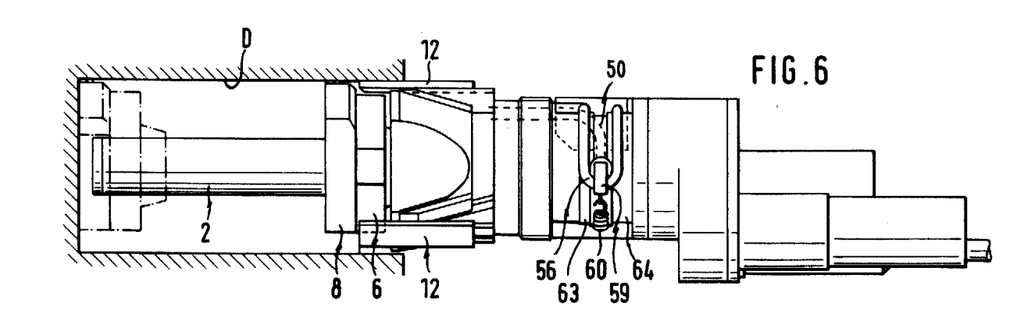
FIGS. 6 and 7 are two lateral views, rotated through 90°, of a measuring device according to the invention, comprising a cable guide means.
Figures 7, 8:
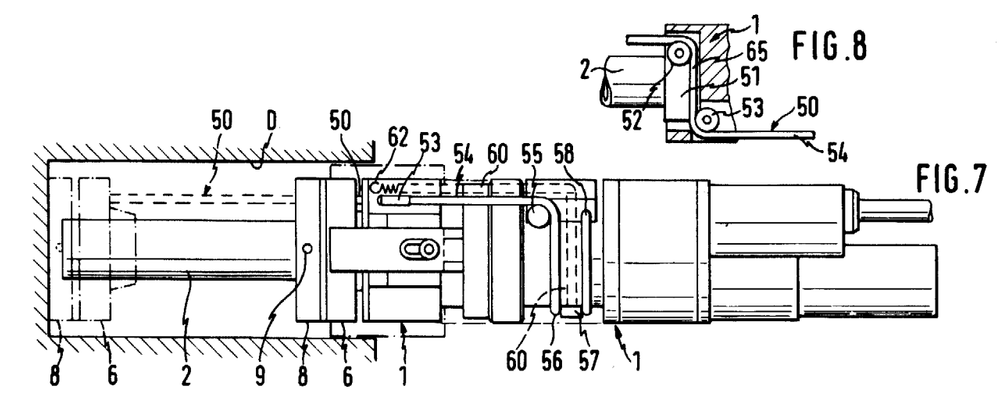
FIG. 8 is a diagrammatic cylinder section at the end of the fixed housing adjacent the measuring head of the measuring device according to FIGS. 6 and 7.

Those parts of the measuring device already described in connection with FIGS. 1 to 5 are designated by the same reference numerals in FIGS. 6 to 8 for reasons of simplicity. FIGS. 6 and 7 in addition show a cable guide device for a cable 50 supplying current to the foil strain gauges 25 in the measuring head 8. The cable 50 passes axially out of the measuring head, i.e. parallel to the measuring arm 2 into a member 51 which is rotatable together with the measuring arm, over a guide roller 52 supported on said member, into the housing 1 to another guide roller 53 supported at the housing, and then again parallel to the axis of the measuring arm 2 in a section 54 up to a guide roller 55 supported at the housing 1. There the cable is deflected in circumferential direction and passed in a loop 56 over a guide roller 57, reoriented by 180°, and passed to a fixed point at the housing at 58. The guide roller 57 is supported on a slide 59 which is movable in circumferential direction. This slide 59 is biased by a helical spring 60 acting against the direction of pull of the loop 56 and guided over part of the circumferential area of the housing between the two cable sections forming the loop 56 and then deflected by 90° about a guide roller (not shown) and returned axially to a hinge point 62 at the housing.

The helical spring 60 holds the cable 50 under constant pull by means of the slide 59, the guide roller 57, and the loop 56 of the cable.

Upon axial displacement of the measuring head 8 along the measuring arm 2 a length of cable is withdrawn which is supplied by the loop 56 acting as a storing means. The pull of the cable moves the slide 59 in circumferential direction along the housing. Dragging of the cable can be avoided by having the cable portions extending in circumferential direction and forming the loop 56 move on rings 63, 64 which are rotatably supported at the housing. When rotating the measuring arm cable length is taken in or passed out by shifting the cable portion 65 extending in circumferential direction between the guide roller 52 which rotates together with the measuring arm 2 and the guide roller 53.

It is obvious that the cable guide device described takes care that the cable feeding current to the measuring head 8 or the foil strain gauges 25 always engages the measuring head axially with respect to the measuring arm at a pull which is predetermined by the helical spring 60 and exerts no force in the direction of movement of the sensor pin 9 so that the changes in length of the cable 50 upon rotation and/or axial displacement of the measuring head 8 cannot falsify the measuring results.

Figures 9, 10:
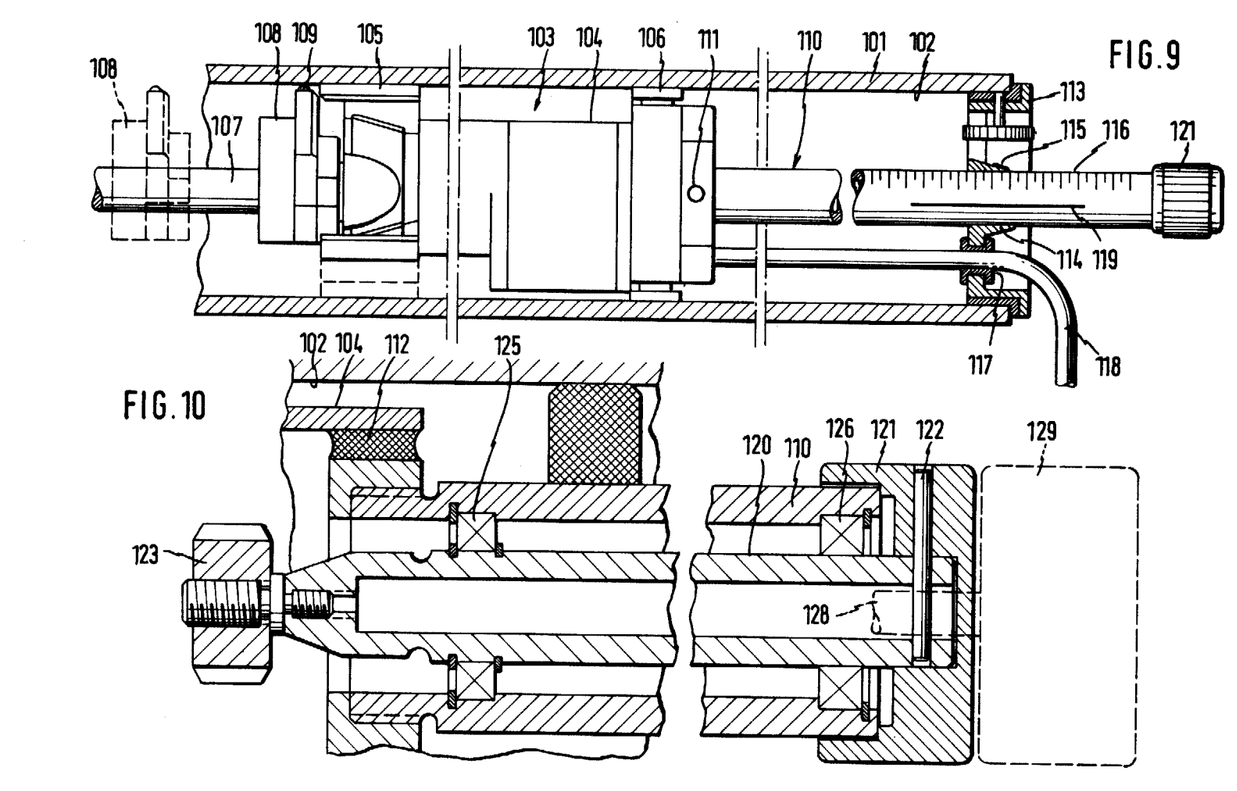
FIG. 9 is a part sectional view of a tube into which a measuring device according to the invention is inserted.
FIG. 10 is a sectional view, on an enlarged scale, of parts of the measuring device according to FIG. 9.
Figure 11:
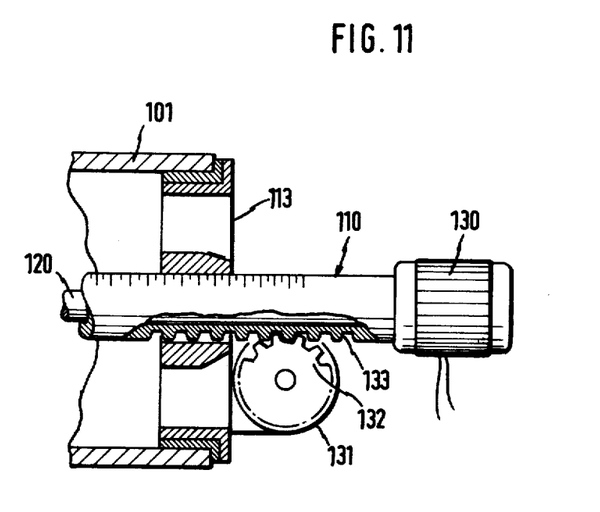
FIG. 11 is a part sectional view of a modification of the measuring device shown in FIG. 9.

In FIGS. 9 to 11 reference numeral 101 designates a tube having a bore wall 102 which is to be measured for its being out of true. The measuring device generally designated 103 comprises a housing 104 which is adapted to be clamped to the bore wall 102 by two clamping jaw groups 105, 106. A measuring arm 107 extends axially away from the housing 104 and carries a rotatable measuring head 108 which is axially displaceable and rotatable and includes a ball-shaped sensor 109 for scanning the bore wall. In FIG. 9 the measuring head 108 is shown in discontinuous lines in its left limit position on the measuring arm 107. Step drive means for producing the axial and rotary motions of the measuring head 108 may be disposed in the housing 104.

A shift rod generally designated by reference numeral 110 is coupled with the right end of the housing by a universal joint fixed for rotation with the shift rod. In FIG. 9 the universal joint is indicated as a circle 111, while in FIG. 10 it is embodied by a rubber joint including a rubber ring 112. The universal joint may also be a cardan joint or a homokinetic joint of known design.

The free end of the shift rod 110 projecting out of the tube 101 is guided in a bearing ring 113 having a guide hub 114 and clamped in the area of the entrance of the bore of the tube 101. The guide hub 114 carries a marking 115, and the shift rod 110 carries a path measuring scale 116 so that the distance of displacement of the shift rod 110 and thus of the measuring device 103 can be read accurately at the marking 115. The bearing ring 113 in addition is provided with a duct portion 117 for a lead-in 118 serving to supply energy and control the step drive means in the housing 104.

The shift rod 110 comprises at least one marked generator line 119 by means of which twisting of the shift rod 110 during displacement in the tube 101 can be avoided.

The shift rod 110 is hollow and houses links, with a shaft 120 adapted to be rotated by a rotary cap 121 provided at the right end of the shift rod 110, as seen in FIG. 9. As shown in FIG. 10, the rotary cap 121 is fixed for rotation to the end of the shaft 120 by means of a pin 122. At its inner end, the left end as seen in FIG. 10, the shaft 120 carries a pinion 123 for driving the two clamping jaw groups in per se known manner (not shown). The shaft 120 is supported for rotation in the shift rod 110 by ball bearings 125, 126.

By twisting the rotary cap 121 the clamping jaw groups 105, 106 thus can be loosened somewhat from the bore wall 102. Then the shift rod 110 is moved further into the bore together with the entire measuring device 103, the distance being determined by the stroke of the measuring head 108 and the clamping jaw groups 105, 106 serving as guidance. The necessary stroke of this shifting movement can be read accurately at the path measuring scale 116 by referring to the marking 115. When the shifting movement is completed, the clamping jaw groups 105, 106 are again clamped against the bore wall 102 by twisting the rotary cap 121. Then the new section of the bore wall 102 can be measured by the measuring head 108.

FIG. 10 shows in discontinuous lines a variant with which another shaft 128 passes through the hollow shaft 120. At its free end this further shaft 128 carries another rotary cap 129 adjacent the rotary cap 121. In this case the shaft 120 and its pinion 123 act on one clamping jaw group 106 only, while the shaft 128 which can be operated independently by the rotary cap 129 acts on the other clamping jaw group 105 (not shown).

It is obvious that the rotary caps 121, 129 may be replaced by independent rotary drive means for the shafts 120, 128.

The measuring device described can be adjusted easily and accurately to the various measuring sections of the bore of a long tube or a long cylinder by means of the shift rod. The length of the measuring sections depends on the length of the axial stroke of the measuring head 108.

The embodiment shown in FIG. 11 differs from the embodiments according to FIGS. 9 and 10 in two respects:

On the one hand, the manually operable rotary cap 121 is replaced by a step motor 130 mounted on the free end of the shift rod 110 and driving the shaft 120 to actuate the clamping jaw group(s).

On the other hand, a step motor 131 is mounted on the bearing ring 113 and this motor may act through a drive pinion 132 on a straight toothing 133 provided at the shift rod 110, thus permitting automatic displacement of the measuring device 103 instead of displacement by hand.

What we claim is:

1. Apparatus for measuring the inner surface of a generally cylindrical bore, comprising
   (a) a housing (1) adapted for insertion within the bore;
   (b) clamping jaw means (12) for clamping said housing within the bore;
   (c) a longitudinal measuring arm (2) rotatably connected with said housing for rotation about, and extending longitudinally of, the bore axis;
   (d) first drive means (5) for rotating said arm relative to said housing;
   (e) a measuring head (8) connected with said measuring arm for axial displacement along the length thereof;
   (f) second drive means (7) for axially displacing said measuring head relative to said arm;
   (g) sensor means (9) connected for radical displacement relative to said measuring head;
   (h) spring means (21) biasing said sensor means radially outwardly relative to said head toward a position in engagement with the inner surface of the bore; and
   (i) means responsive to the deflection of said spring for generating an electrical signal corresponding with the radial displacement of said sensor means relative to said measuring head, thereby to afford an indication of the inner surface contour of the bore.

2. Apparatus as defined in claim 1, and further comprising
   (j) a cable for supplying electric current to said measuring head, said cable extending from said housing along said arm to said measuring head; and
   (k) cable compensating means for storing, taking in, and passing out said cable in accordance with rotational and axial movement of said measuring head.

3. Apparatus as defined in claim 2, wherein said cable compensating means comprises
   (1) slide means movable circumferentially about said housing;
   (2) spring means for biasing said slide means against the direction of cable pull;
   (3) compensating roller means arranged on said slide means to define a loop of said cable for passing out and taking in said cable relative to said housing; and
   (4) a guide roller rotatable with said measuring arm for guiding said cable.

4. Apparatus as defined in claim 1, and further comprising means for axially displacing said housing within the bore, said housing displacement means comprising
   (1) a hollow shift rod extending longitudinally of the bore axis; and
   (2) link means connecting said shift rod with said clamping jaw means, said shift rod and said links being operable to release and clamp said clamping jaw means.

5. Apparatus as defined in claim 4, and further comprising bearing means for supporting said shift rod at the entrance to the bore for axial displacement relative thereto.

6. Apparatus as defined in claim 5, wherein said shift rod contains a scale for measuring axial displacement of said shift rod within the bore.

7. Apparatus as defined in claim 4, and further comprising a universal joint for connecting said shift rod with said housing.

8. Apparatus as defined in claim 4, and further comprising third drive means for axially displacing said shift rod.

9. Apparatus for measuring the inner surface of a generally cylindrical bore, comprising
   (a) a housing adapted for insertion within the bore;
   (b) clamping jaw means for clamping said housing within the bore;
   (c) a longitudinal measuring arm rotatably connected with said housing for rotation about, and extending longitudinally of, the bore axis;
   (d) first drive means for rotating said arm relative to said housing;
   (e) a measuring head connected with said measuring arm for axial displacement along the length thereof;
   (f) second drive means for axially displacing said measuring head relative to said arm;
   (g) sensor means connected for radial displacement relative to said measuring head;
   (h) leaf spring means connected at one end with said measuring head, the free end of said leaf spring means being movable in the direction of the longitudinal axis of said sensor means to bias said sensor means radially outwardly relative to said head toward a position in engagement with the inner surface of the bore; and
   (i) foil strain gauge means responsive to the deflection of said leaf spring for generating an electrical signal corresponding with the radial displacement of said sensor means relative to said measuring head, thereby to afford an indication of the inner surface contour of the bore.

10. Apparatus as defined in claim 9, wherein the free end of said leaf spring is arranged transversely of the longitudinal axis of said sensor means, and further wherein the intermediate portion of said leaf spring means is arranged at an angle of between 145° and 165° relative to said spring free end.

11. Apparatus as defined in claim 10, wherein said angle is approximately 160°.

12. Apparatus as defined in claim 10, wherein said spring intermediate portion extends generally rectilinearly.

13. Apparatus as defined in claim 9, wherein said leaf spring is curved in a circular arc between its clamping and free ends.

14. Apparatus as defined in claim 9, wherein said strain gauges are arranged on opposite sides of said leaf spring means.

* * * * *